(12) United States Patent
Takezawa

(10) Patent No.: US 11,965,615 B2
(45) Date of Patent: Apr. 23, 2024

(54) PIPE JOINT

(71) Applicant: TATSUNO CORPORATION, Tokyo (JP)

(72) Inventor: Masahiro Takezawa, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 327 days.

(21) Appl. No.: 17/524,498

(22) Filed: Nov. 11, 2021

(65) Prior Publication Data

US 2022/0163152 A1 May 26, 2022

(30) Foreign Application Priority Data

Nov. 24, 2020 (JP) .................................. 2020-194101

(51) Int. Cl.
*F16L 35/00* (2006.01)
*F17C 13/04* (2006.01)

(52) U.S. Cl.
CPC ............ *F16L 35/005* (2013.01); *F17C 13/04* (2013.01); *F16L 2201/20* (2013.01); (Continued)

(58) Field of Classification Search
CPC ..... F16L 35/005; F16L 2201/20; F17C 13/04; F17C 2205/0323; F17C 2221/012; F17C 2265/065
(Continued)

(56) References Cited

U.S. PATENT DOCUMENTS

| | | | |
|---|---|---|---|
| 8,485,235 B2 * | 7/2013 | Cuzydlo | A61M 39/26 141/351 |
| 2018/0172191 A1 * | 6/2018 | Takezawa | F16L 27/06 |

(Continued)

FOREIGN PATENT DOCUMENTS

| | | |
|---|---|---|
| EP | 3428502 A1 | 1/2019 |
| JP | 2006097874 A | 4/2006 |

(Continued)

OTHER PUBLICATIONS

Extended European Search Report for EP21204732; dated Mar. 8, 2022.

*Primary Examiner* — Timothy P. Kelly
*Assistant Examiner* — Christopher M Afful
(74) *Attorney, Agent, or Firm* — Stetina Brunda Garred & Brucker

(57) ABSTRACT

To provide a pipe joint that can immediately shut off a hydrogen gas flow path at an initial stage when a plug (nozzle side member) comes out of a socket (filling apparatus side member) to prevent release of outgas. A pipe joint (100) of the present invention includes: a cylindrical nozzle side member (10) with a shutoff valve (5), in the cylindrical nozzle side member (10) being formed a passage (1A); and a cylindrical filling apparatus side member (20) with a shutoff valve (24), in the cylindrical filling apparatus side member (20) being formed a passage (21A), wherein when the nozzle side member (10) and the filling apparatus side member (20) are connected with each other, central axes of the passages (1A, 21A) of the nozzle side member (10) and the filling apparatus side member (20) do not form a same straight line, and the central axes of the passages (1A, 21A) are offset without intersecting, and the shutoff valves (5, 24) of the both members (10, 20) open to communicate the passages (1A, 21A) of the both members (10, 20) with each other, and when the nozzle side member (10) is separated from the filling apparatus side member (20), the shutoff valves (5, 24) of the both members (10, 20) close.

5 Claims, 14 Drawing Sheets

(52) U.S. Cl.
 CPC ............... *F17C 2205/0323* (2013.01); *F17C 2221/012* (2013.01); *F17C 2265/065* (2013.01)

(58) Field of Classification Search
 USPC .......................................... 141/346, 351, 18
 See application file for complete search history.

(56) References Cited

U.S. PATENT DOCUMENTS

| | | | |
|---|---|---|---|
| 2019/0017616 A1* | 1/2019 | Takezawa | ............... B60K 15/04 |
| 2019/0017640 A1* | 1/2019 | Takezawa | ............ B67D 7/3218 |
| 2022/0163152 A1* | 5/2022 | Takezawa | ............. F16L 35/005 |
| 2022/0221076 A1* | 7/2022 | Takezawa | ................. F17C 7/00 |
| 2022/0221111 A1* | 7/2022 | Takezawa | ........... F16L 55/1007 |

FOREIGN PATENT DOCUMENTS

| | | |
|---|---|---|
| JP | 6540967 A | 6/2018 |
| WO | 2015132841 A1 | 9/2015 |

* cited by examiner

[Fig.1]
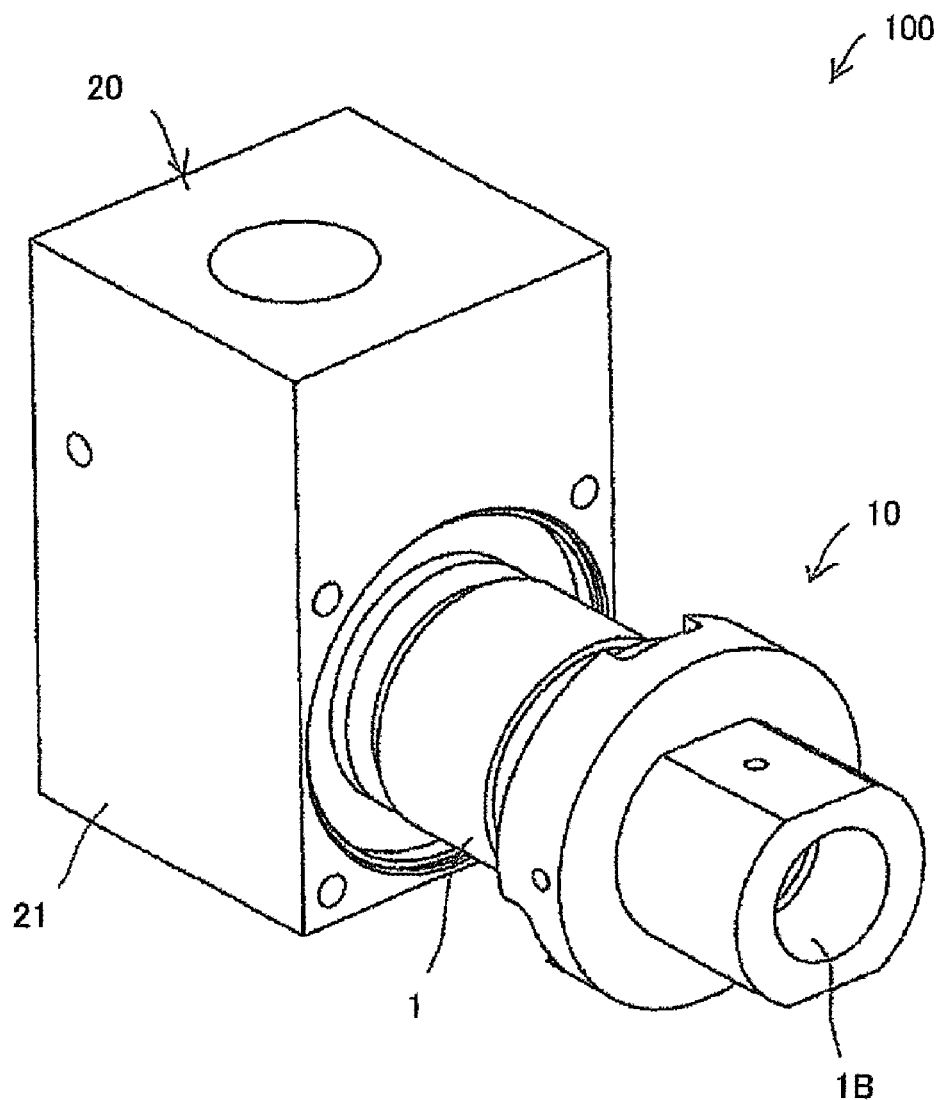

[Fig.2]
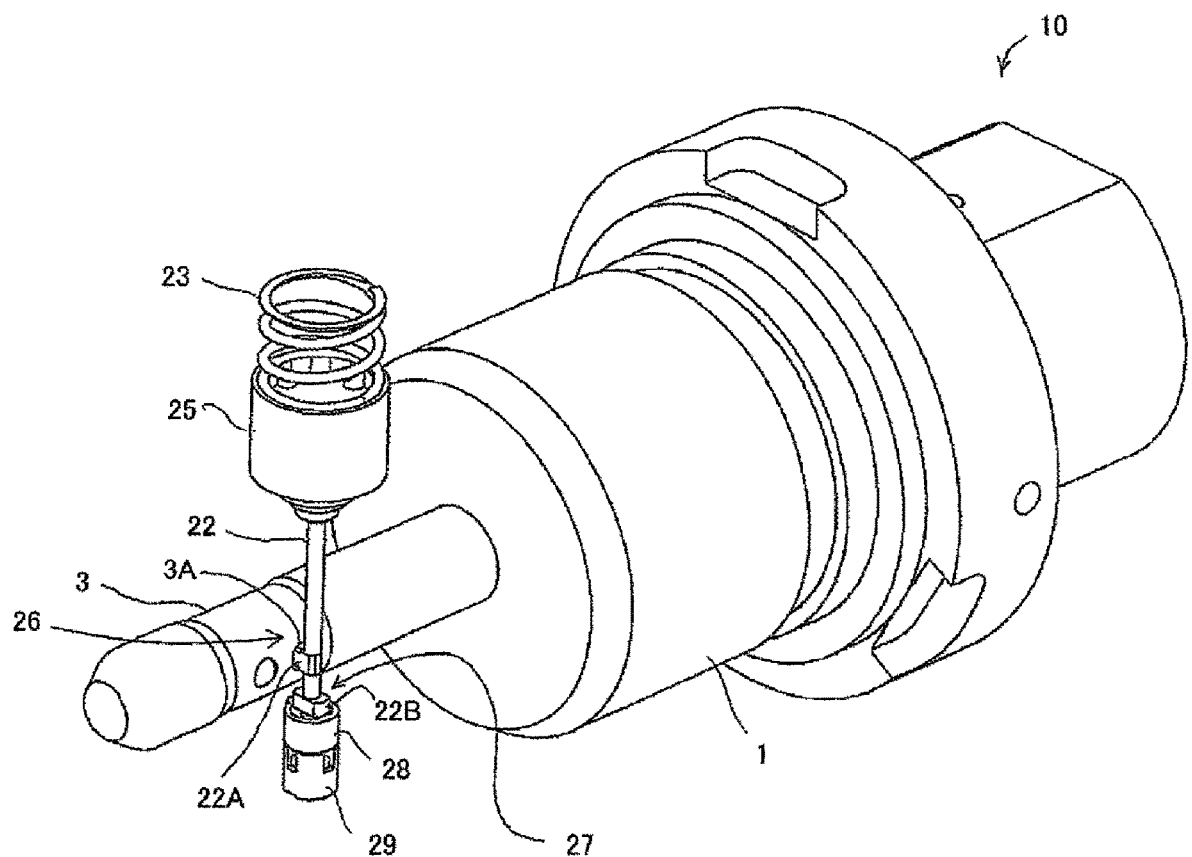

[Fig.3]
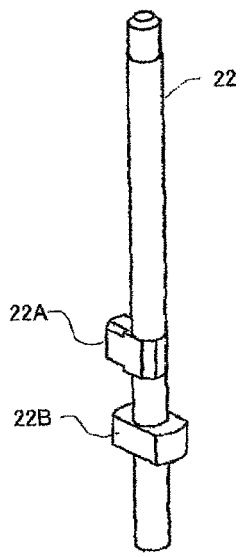
[Fig.4A] (A)
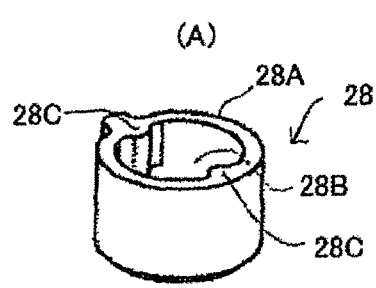
[Fig.4B] (B)
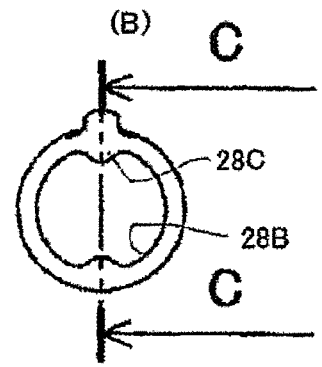
[Fig.4C] (C)
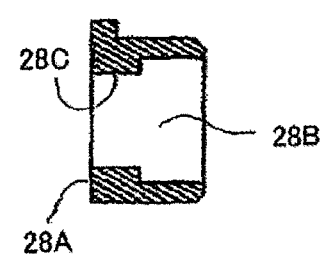
[Fig.5A] (A)
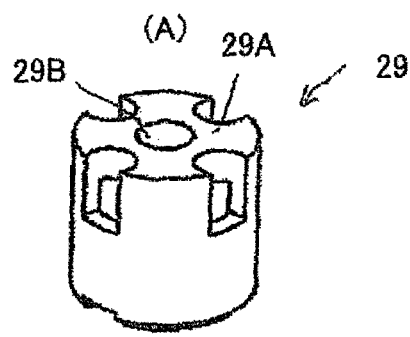
[Fig.5B] (B)
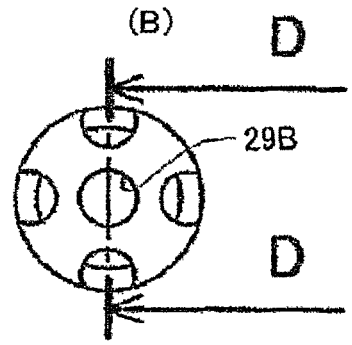
[Fig.5C] (C)
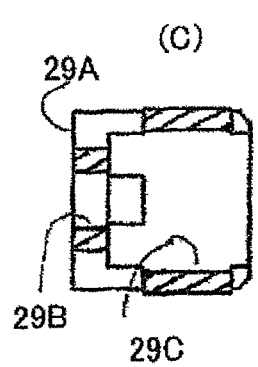

[Fig.6]
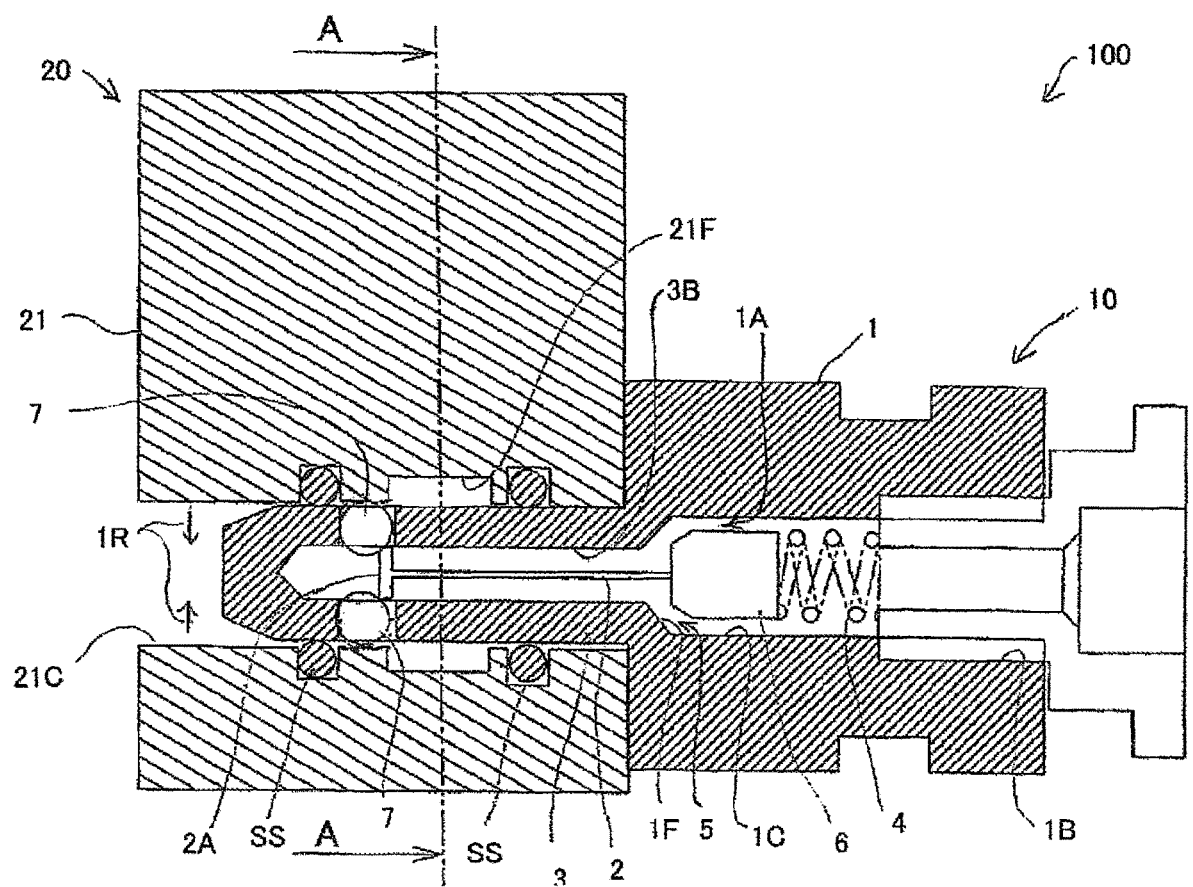

[Fig.7]
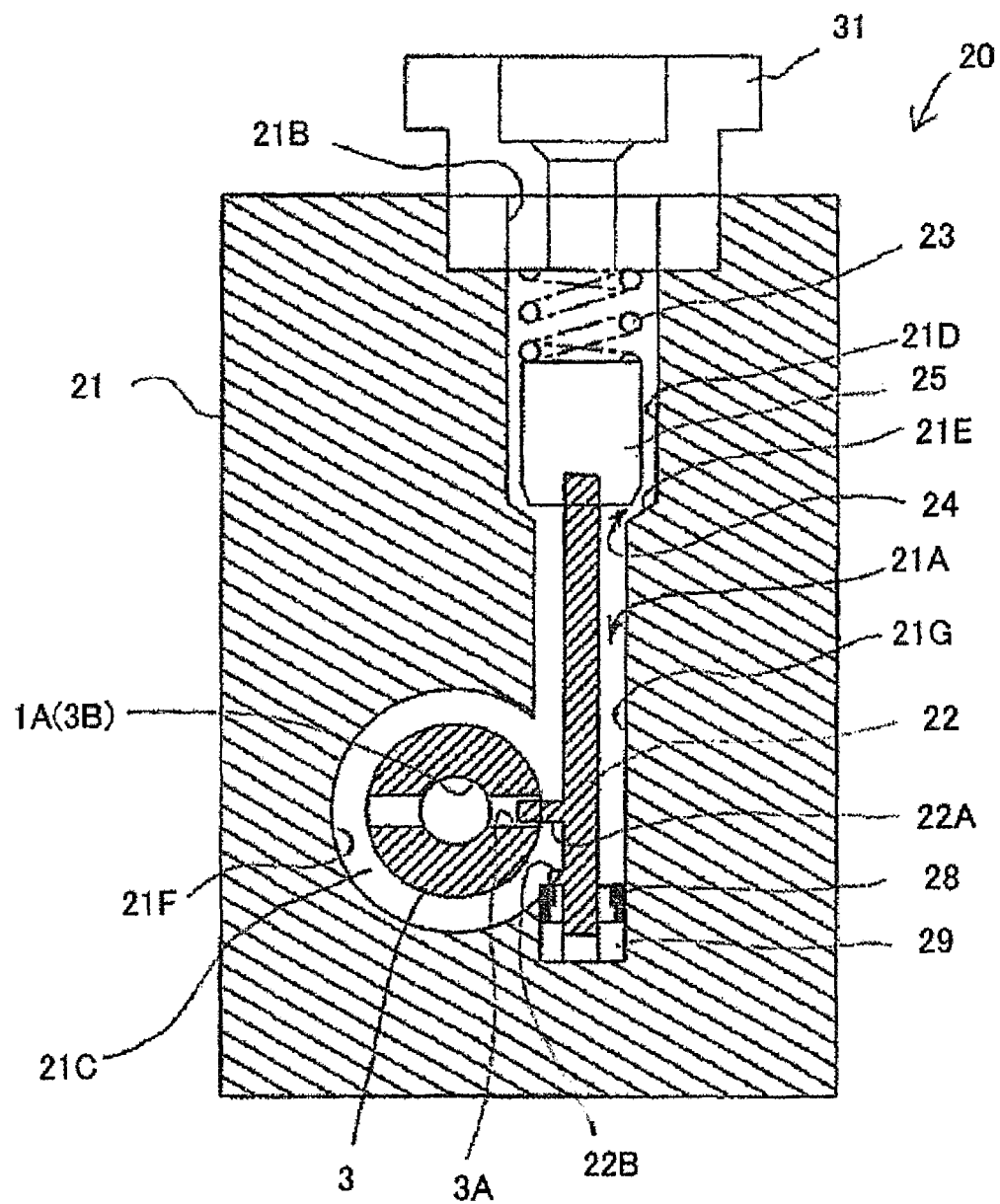

[Fig. 8]
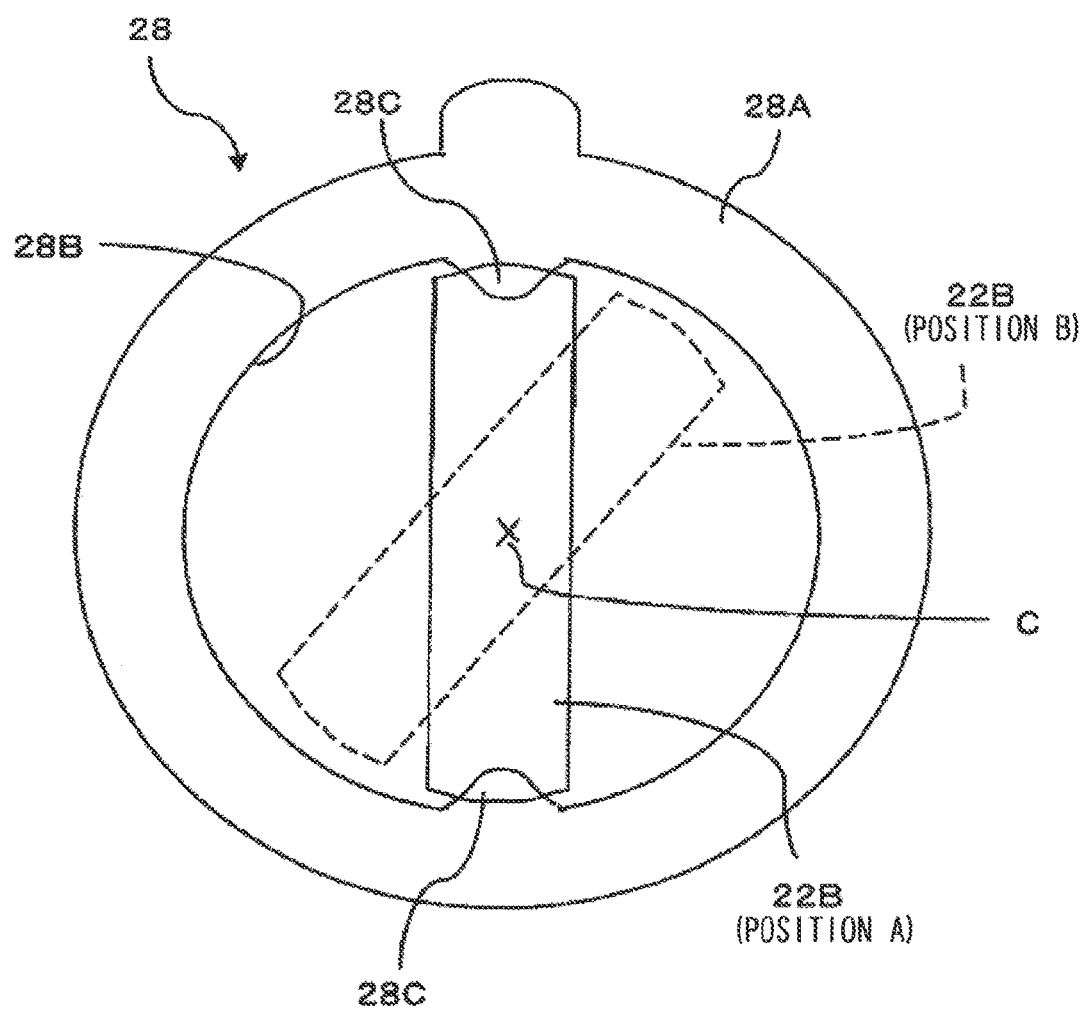

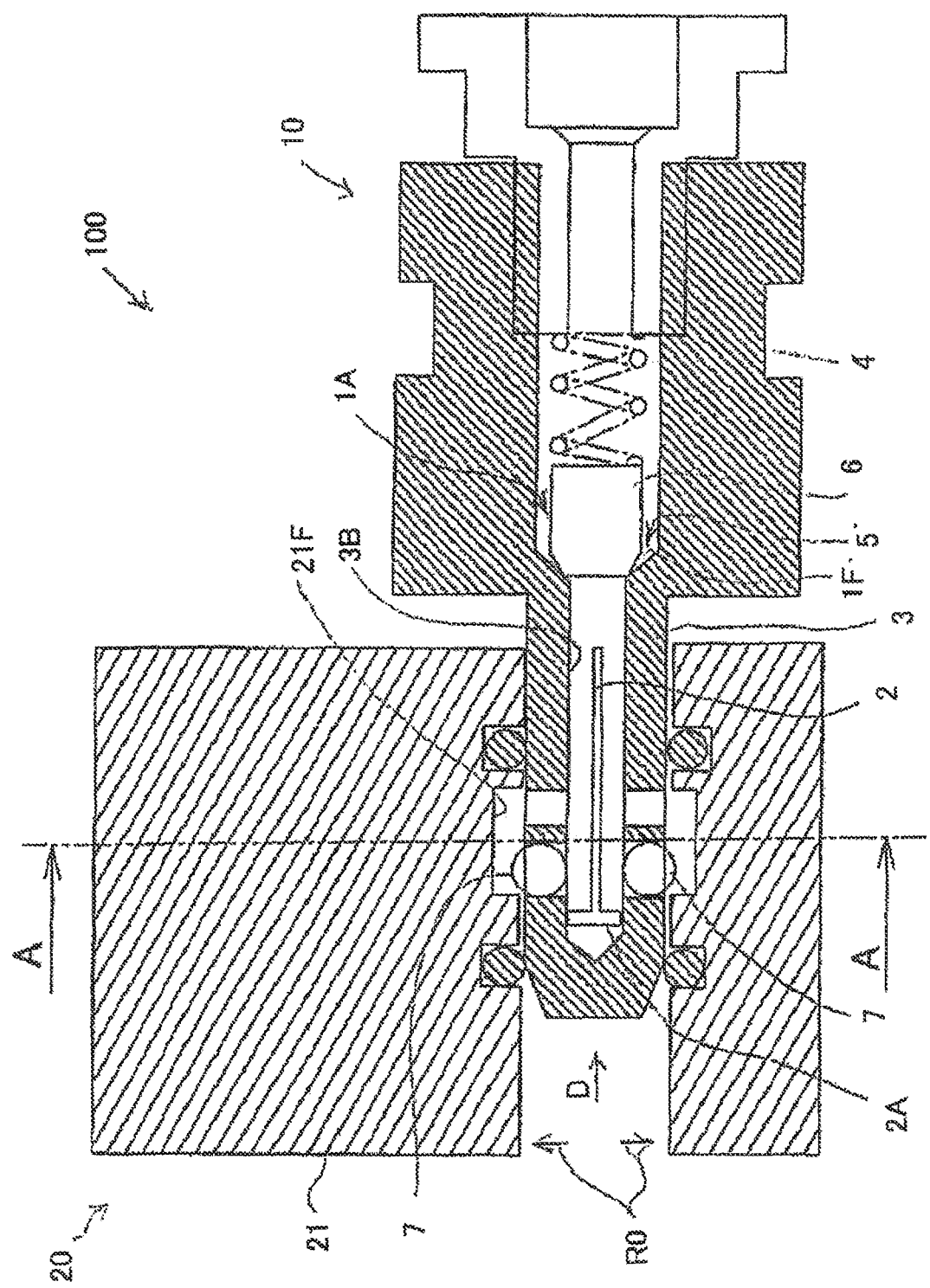
[Fig.9]

[Fig. 10]
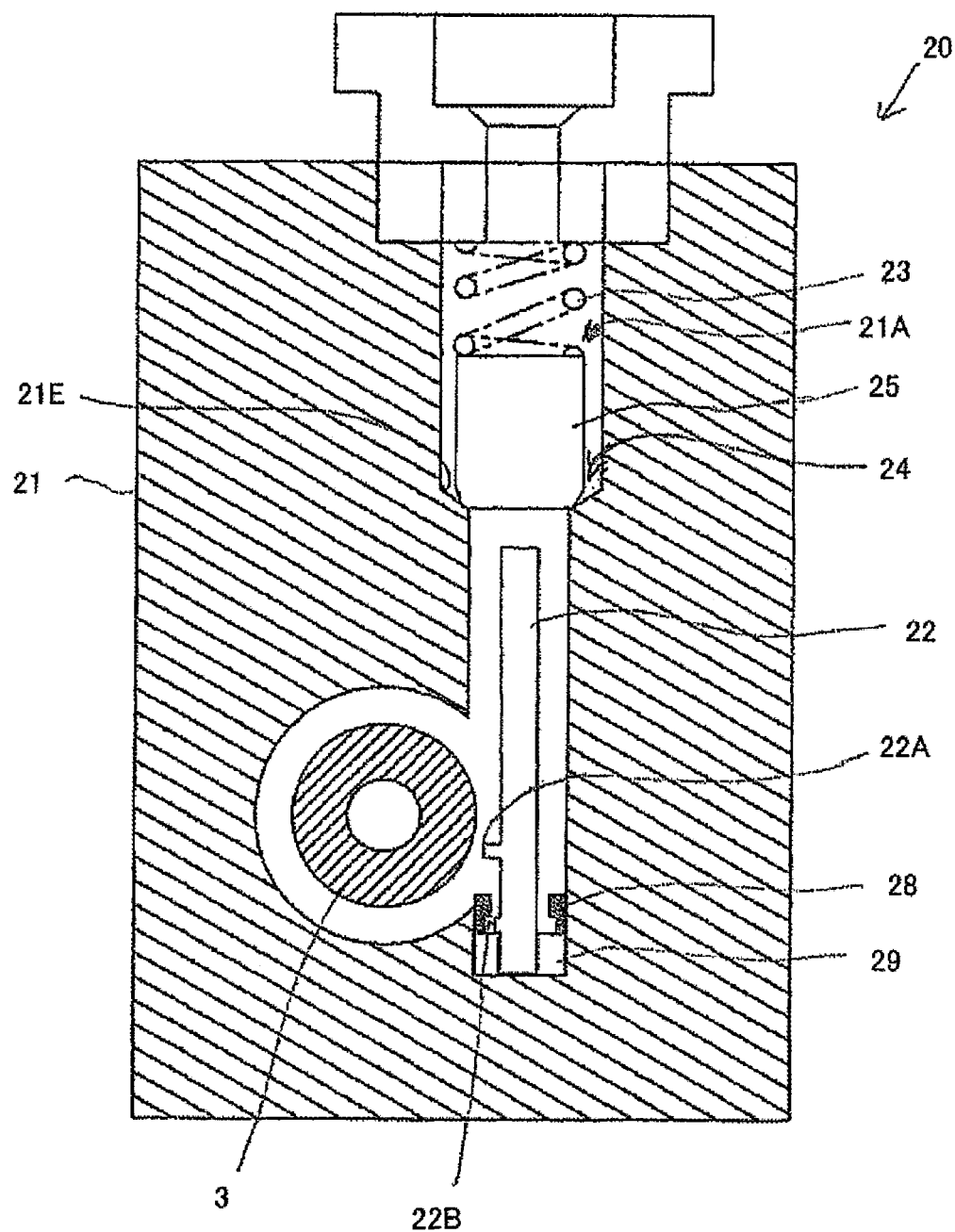

[Fig.11]
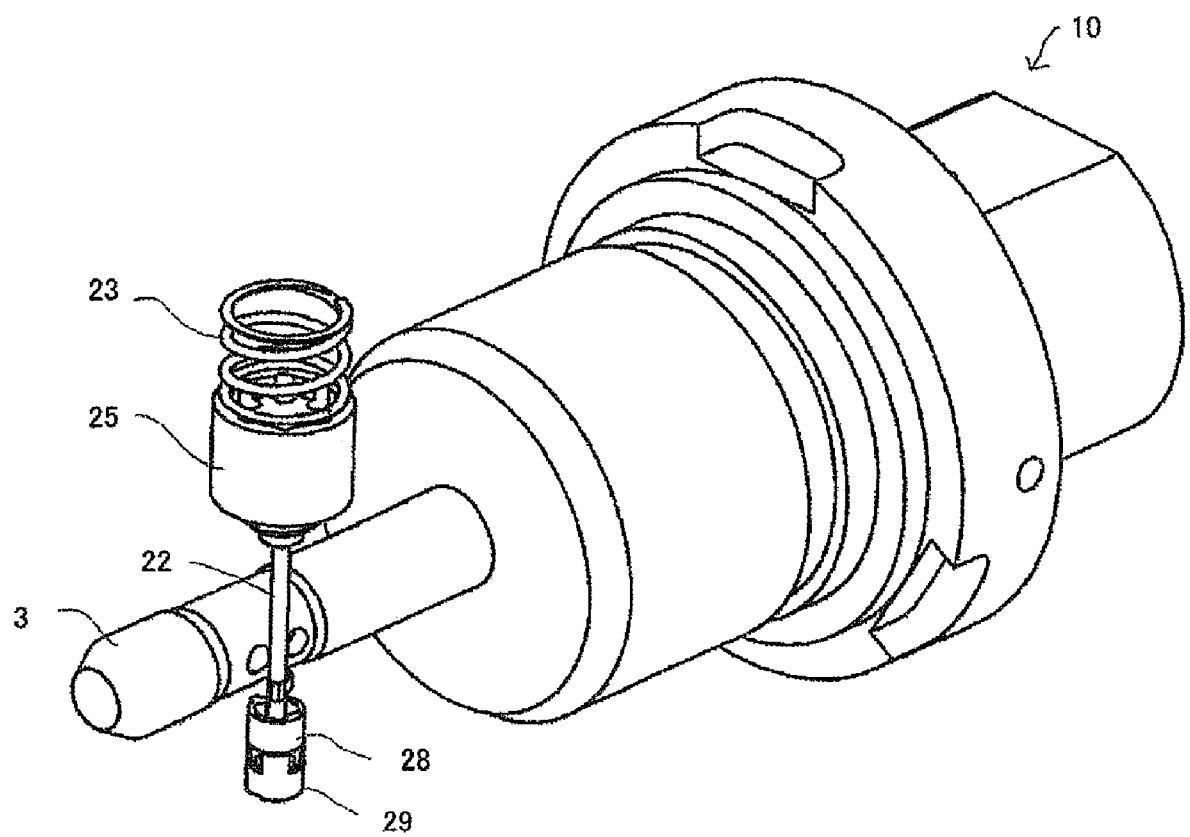

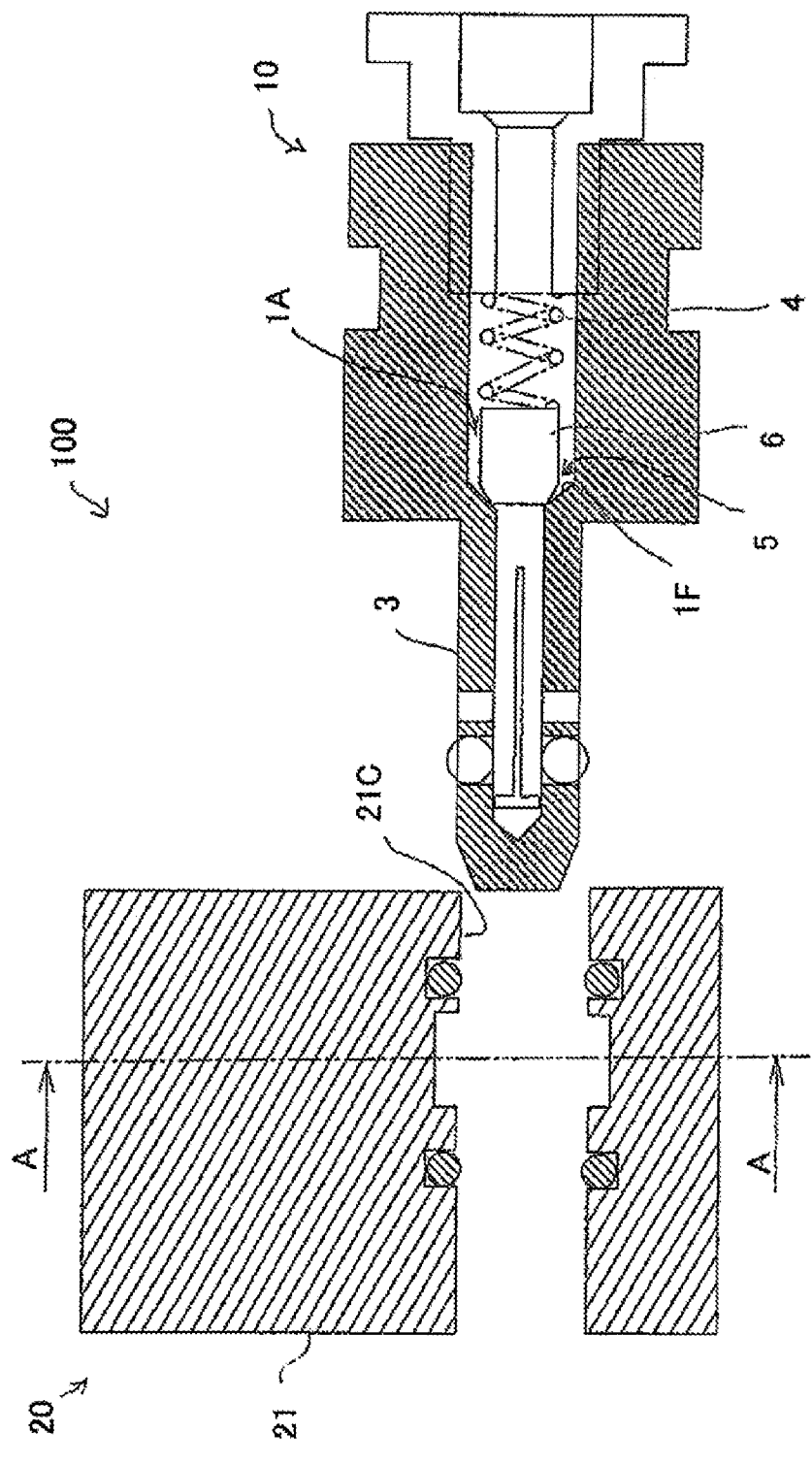
[Fig.12]

[Fig.13]
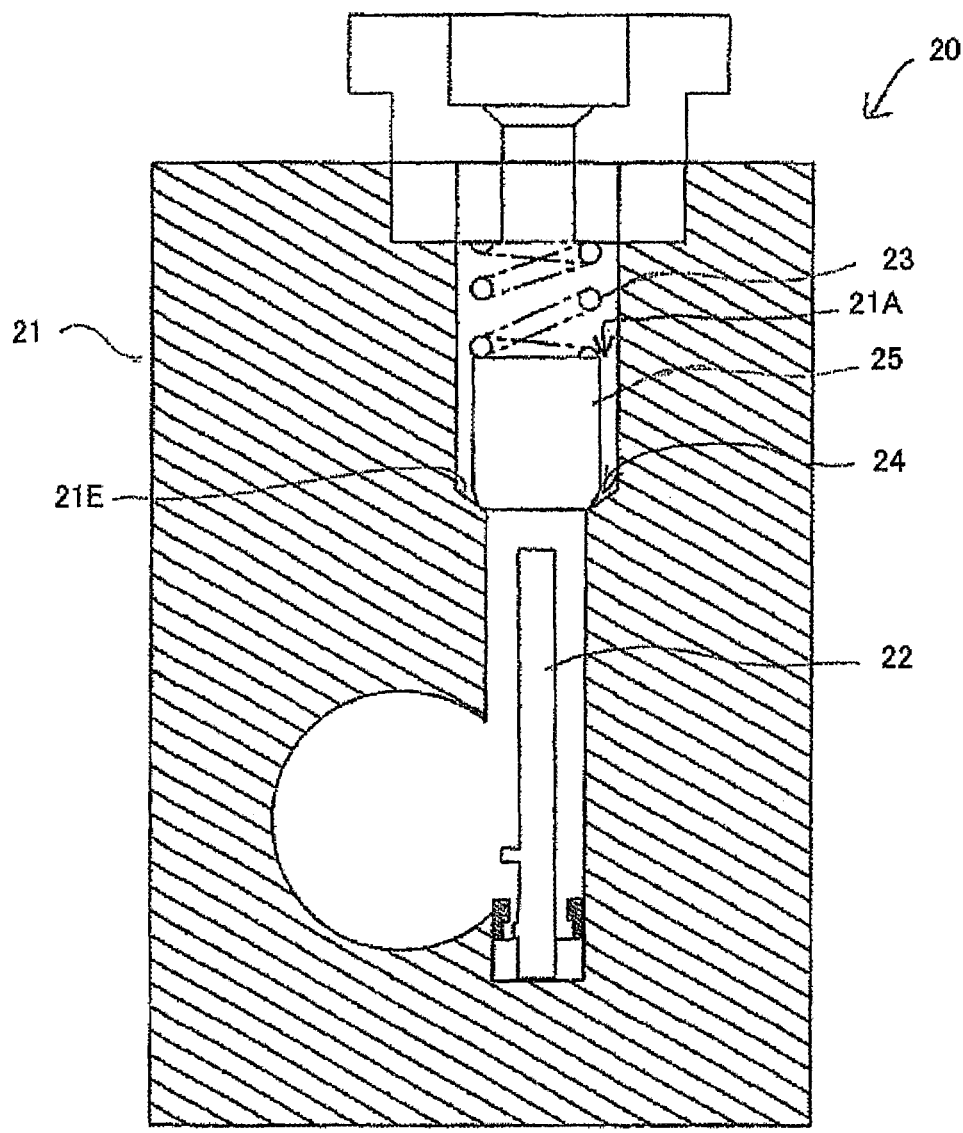

[Fig.14]
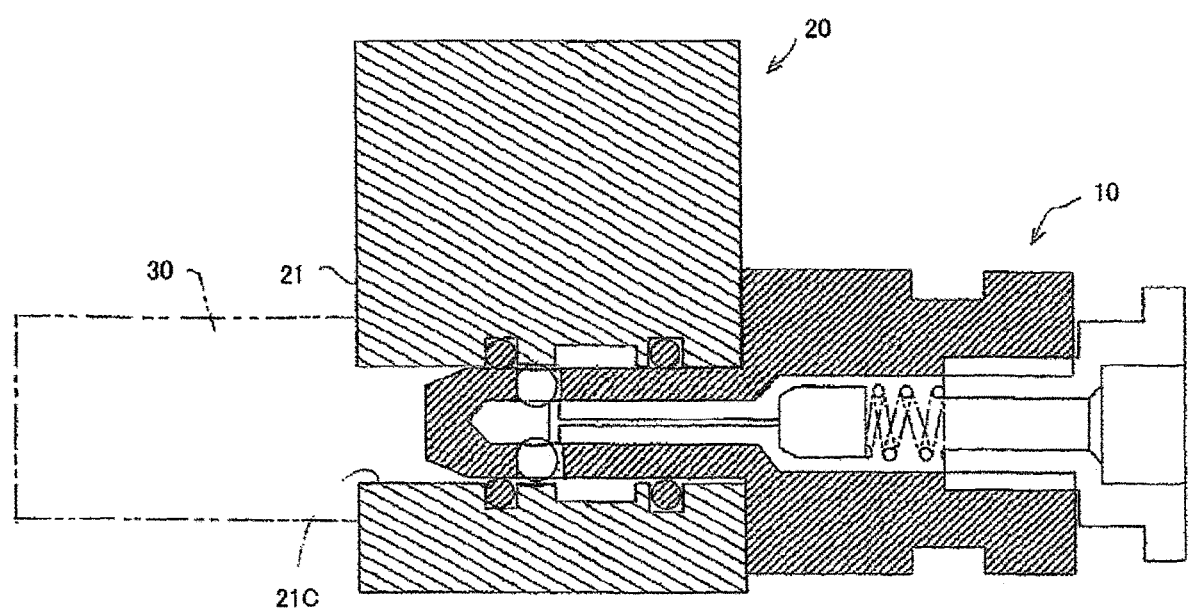

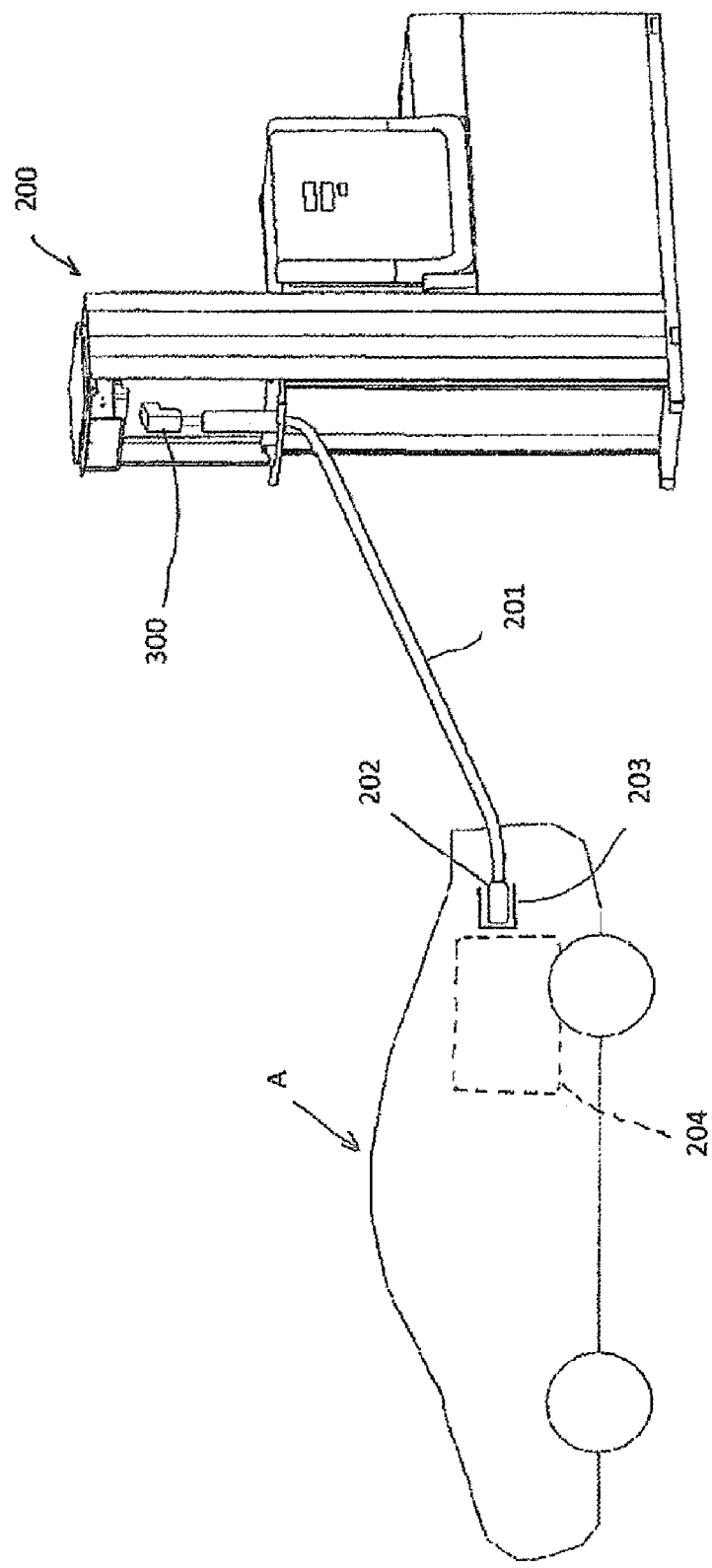
[Fig.15]

[Fig.16]
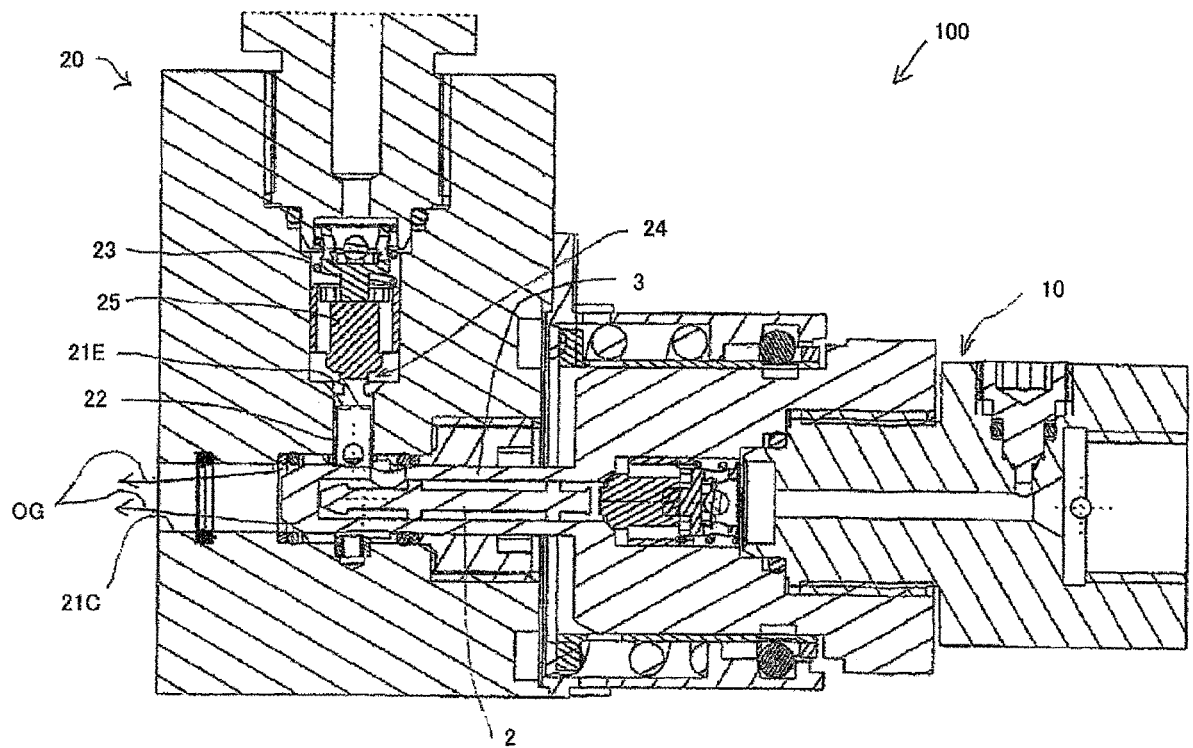

PIPE JOINT

CROSS-REFERENCE TO RELATED APPLICATIONS

The present application claims priority to Japanese Patent Application No. 2020-194101 filed on Nov. 24, 2020, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a filling apparatus for filling gas such as hydrogen gas used as fuel. More particularly, the present invention relates to a pipe joint for separating the filling apparatus and a gas filling nozzle from each other in an emergency while a gas is filled with the filling apparatus.

2. Description of the Related Art

For example, as show in FIG. 15, to a vehicle A using hydrogen as fuel, at a hydrogen filling station is filled hydrogen gas after a filling nozzle 202 attached to an end of a filling hose 201 of a hydrogen filling apparatus 200 and a vehicle side filling port 203 are connected with each other. The filling is performed while being controlled depending on the maximum using pressure of a hydrogen tank 204 mounted to the vehicle A. Here, when the vehicle A runs to pull the filling hose 201 while hydrogen gas is filled, for instance, parts such as the filling nozzle 202 and the filling hose 201 are broken to inject a hydrogen gas, so that it becomes a dangerous condition. Then, a pipe joint 300 for emergency releasing is mounted between the hydrogen filling apparatus 200 and the filling hose 201, and when to the filling hose 201 is applied a tensile force more than a predetermined value, the pipe joint 300 for emergency releasing is divided to prevent the parts such as the filling nozzle 202 and the filling hose 201 from being broken.

As a prior art, the present applicant proposed a pipe joint (for emergency releasing) including: a cylindrical plug (filling nozzle side member) in which a passage is formed; a cylindrical socket (filling apparatus side member) in which a passage is formed; and when the plug is inserted into the socket, shutoff valves open the passages of the plug and the socket to communicate the passages with each other, and when the plug is detached from the socket, the shutoff valves close. In the pipe joint for emergency releasing, central axes of the passages of the plug and the socket do not form a same straight line; when the plug is reinserted into the socket, an end of a socket side valve stem (an end, opposing the end of the socket side valve stem, of a valve element) abuts a plug side rod accommodating case and a valve element mounted to the other side of the socket side valve stem is held at a position separated from a socket side valve seat against elastic repulsive force of an elastic body on the socket side, and a locking member held in a plug side accommodating case is restricted to move radially outward by an inner wall at a socket body side opening, and a plug side valve stem abuts the locking member and does not move toward the socket side, and the valve body provided on the plug side valve stem is held at a position separated from a plug side valve seat against elastic repulsive force of an elastic body on the plug side (refer to Patent Document 1). This pipe joint is very useful.

However, as shown in FIG. 16, in the pipe joint 100 (of Patent Document 1), when a large tensile force acts on the filling hose 201 (shown in FIG. 15), and at an initial stage of the process that the plug 10 is pulled out from the socket 22 (the stage at which the plug 10 starts to come out), the socket side rod 22 connected to the valve body 25 on the socket 20 side is placed on the plug side valve stem 2 or a cover member 3 of the valve stem. Under the condition that the socket side rod 22 is placed on the plug side valve stem 2 or the cover member 3 of the valve stem (the state shown in FIG. 16), the socket side valve body 25 positions separately from the socket side valve seat 21E against an elastic repulsive force of a spring 23 on the socket 20 side, which causes the socket side shutoff valve 24 to be held in an open state. At the stage shown in FIG. 16, that is, the initial stage where the plug 10 is ejected from the socket 20 (the stage where the plug 10 is beginning to be ejected), a high-pressure hydrogen gas supplied from the filling apparatus 200 (FIG. 15) through the opening 21C on the socket 20 side flows out to the outside of the pipe joint 100 as a so-called "outgas" (the arrow OG in FIG. 16).

Patent Document 1: Japan Patent No. 6540967 gazette

BRIEF SUMMARY

The present invention has been made in consideration of the above problems in the prior art, and the object thereof is to provide a pipe joint that can immediately shut off a hydrogen gas flow path at the initial stage when the plug, which is a nozzle side member, comes out of the socket, which is a filling apparatus side member, to prevent release of the outgas.

A pipe joint (100) of the present invention include: a cylindrical nozzle side member (10: plug) with a shutoff valve (5: plug side shutoff valve), in the cylindrical nozzle side member (10) being formed a passage (1A: in-plug passage); and a cylindrical filling apparatus side member (20: socket) with a shutoff valve (24: socket side shutoff valve), in the cylindrical filling apparatus side member (20) being formed a passage (21A: in-socket passage), wherein when the nozzle side member (10) and the filling apparatus side member (20) are connected with each other, central axes of the passages of the nozzle side member (10) and the filling apparatus side member (20) do not form a same straight line, and the central axes of the passages (1A, 21A) are offset without intersecting, and the shutoff valves (5, 24) of the both members (10, 20) open to communicate the passages (1A, 21A) of the both members (10, 20) with each other, and when the nozzle side member (10) is separated from the filling apparatus side member (20), the shutoff valves (5, 24) of the both members (10, 20) close.

In the present invention, it is preferable that the filling apparatus side member (20) includes a filling apparatus side rod-shaped member (22: socket side rod) extending from a valve body (25) of the shutoff valve (24) to the nozzle side member (10) side, and the pipe joint (100) further including: a first conversion mechanism (26) for converting a movement of the nozzle side member (10) when the nozzle side member (10) is separated from the filling apparatus side member (20) into a rotation of the filling apparatus side rod-shaped member (22), and a second conversion mechanism (27) for converting the rotation of the filling apparatus side rod-shaped member (22) into a movement of the rod-shaped member (22) toward the nozzle side member (10) in a central axis direction of the rod-shaped member (22).

Here, it is preferable that the first conversion mechanism (26) includes a recess (3A: for example a channel or hole) formed on a protruding portion (3: plug side protruding portion) of the nozzle side member (10), the protruding portion (3) being inserted into a through hole (21C: socket through hole) formed in the filling apparatus side member (20) in a state where the nozzle side member (10) and the filling apparatus side member (20) are connected with each other, and a first protrusion (22A), formed on the filling apparatus side member (20), insertable into the recess (3A).

In addition, it is preferable that the second conversion mechanism (27) includes a second protrusion (22B) provided on an end portion (tip of the socket sided rod 22) of the filling apparatus side rod-shaped member (22) on a side separated from the valve body (25) of the filling apparatus side shutoff valve (24), and a hollow member (28: first cylindrical member) with an upper edge portion (28A) on which the second protrusion (22B) is placeable, wherein when the nozzle side member (10) is connected to the filling apparatus side member (20), the second protrusion (22B) is placed on the upper edge portion (28A), and when the filling apparatus side rod-shaped member (22) rotates, the second protrusion (22B) separates from the upper edge portion (28A) and moves in a hollow internal space (28B).

It is preferable that the second protrusion (22B) has a rectangular shape, and the upper edge portion (28A) of the hollow member (28) has a shape having convex portions (28C) protruding radially inward at positions symmetrical with respect to a central axis (radially opposing with each other) of the hollow member (28), and when the nozzle side member (10) is connected to the filling apparatus side member (20), both ends, in a longitudinal direction, of the second protrusion (22B) are positioned on the convex portions (28C) at the upper edge portion (28A) of the hollow member (28), and the filling apparatus side rod-shaped member (22) rotates, the both ends of the second protrusion (22B) come off from the convex portions (28C) of the upper edge portion (28A).

With the pipe joint (100) with the above construction, since central axes of the passages (1A: in-plug passage, 21A: in-socket passage) do not form a same straight line (for example, the central axes are orthogonal), and the central axes of the passages (1A, 21A) are offset without intersecting, a movement of the nozzle side member (10) when the nozzle side member (10) is detached from the filling apparatus side member (20) is easily converted into a rotation of the filling apparatus side rod-shaped member (22). Then, the rotation of the filling apparatus side rod-shaped member (22) can be rapidly and surely converted into a movement of the filling apparatus side rod-shaped member (22) in a central axis thereof toward the nozzle side member (10). With an elastic body (23: socket side spring) on the filling apparatus side member (20) for instance, the movement of the filling apparatus side rod-shaped member (22) toward the nozzle side member (10) side causes a valve body (25: socket side valve body) of the filling apparatus side shutoff valve (24: socket side shutoff valve) to be pressed to the valve seat (21E: socket side valve seat) through elastic repulsive force of the elastic body (23), and the filling apparatus side shutoff valve (24) is rapidly and surely closed. As a result, in the present invention, unlike the prior art described with reference to FIG. 16, at the initial stage when the nozzle side member (10) is detached from the socket 20, the filling apparatus side valve body (25) immediately seats on the filling apparatus side valve seat (21E) to close the shutoff valve (24) of the filling apparatus side member (20). In other words, when the nozzle side member (10) is detached from the filling apparatus side member (20), the shutoff valve (24) of the filling apparatus side member (20) immediately changes from an open state to a closed state, so that the shutoff valve (24) on the filling apparatus side member (20) side is prevented from being in open state (the state shown in FIG. 16) although the nozzle side member (10) is detached from the socket 20. With this, flow rate of high-pressure gas (out gas) discharged from the pipe joint (100) becomes remarkably small when the nozzle side member (10) is released from the filling apparatus side member (20).

BRIEF DESCRIPTION OF THE DRAWINGS

FIG. 1 is a perspective view of a pipe joint according to an embodiment of the present invention;

FIG. 2 is a perspective view of the pipe joint shown in FIG. 1 without a socket side casing;

FIG. 3 is a perspective view of a socket side rod;

FIG. 4A shows a first cylindrical member vertically supporting the socket side rod in a state that a plug is not separated from a socket;

FIG. 4B is a top elevational view of the first cylindrical member shown in FIG. 4A;

FIG. 4C is a cross-sectional view of the first cylindrical member taken along line C-C of FIG. 4B;

FIG. 5A shows a second cylindrical member horizontally supporting the socket side rod while allowing vertical movement thereof;

FIG. 5B is a top elevational view of the second cylindrical member shown in FIG. 5A;

FIG. 5C is a cross-sectional view of the second cylindrical member taken along line D-D of FIG. 5B;

FIG. 6 is a cross sectional view showing the plug is not separated from the socket;

FIG. 7 is the cross sectional view taken along the A-A line in FIG. 6;

FIG. 8 is an explanatory plan view for explaining position and dimension of a second protrusion of the socket side rod relative to an upper edge portion of the first cylindrical member;

FIG. 9 is a cross sectional view showing an initial stage of the process that the plug is pulled out from the socket;

FIG. 10 is the cross sectional view taken along the A-A line in FIG. 9;

FIG. 11 is a perspective view showing the initial stage of the process that the plug is pulled out from the socket without a casing of the socket;

FIG. 12 is a cross sectional view showing a condition that the plug is pulled out from the socket;

FIG. 13 is the cross sectional view taken along the A-A line in FIG. 12;

FIG. 14 is a cross sectional view showing a pipe joint according to a modification example of the embodiment;

FIG. 15 is a block diagram showing an outline of a hydrogen filling facility; and FIG. 16 is a cross sectional view showing an initial stage of the process that the plug is pulled out from the socket in a prior art.

DETAILED DESCRIPTION

Hereinafter, embodiments of the present invention will be explained with reference to the attached drawings. In the illustrated embodiments, the same members as shown in FIG. 16 (conventional art) are designated by the same reference numerals. In FIGS. 1 and 2, a pipe joint represented by reference numeral 100 as a whole has a socket 20 which is a member on a filling apparatus side and a plug 10 which is a member on a nozzle side. Here, longitudinal directions of the plug are different between FIGS. 1 and 2. This is to make overall configurations easier to see. Further, in order to clearly show internal structure of the socket 20, in FIG. 2, a prismatic casing 21 (socket body: FIG. 1) of the socket 20 and an upper end lid 31 (FIG. 7) are omitted. FIGS. 1 and 2 show a condition that the plug 10 and the socket 20 are connected with each other. The plug 10 with a cylindrical shape as a whole has a plug body 1 and a plug side protruding member 3 (FIG. 2) protruding toward the socket 20 side. A hydrogen gas supply port 1B (FIG. 1) connected to a filling hose (not shown) is provided at an end (right end of a plug body 1 in FIG. 1) of the plug body 1 on a vehicle side (right side in FIGS. 1 and 2: side separated from the socket 20 side). An in-plug passage (reference numeral 1A in FIGS. 6 and 7) is formed inside the plug body 1 and the plug side protruding member 3, and the in-plug passage 1A extends in an axial direction (left-right direction) of the plug 10.

In FIG. 2, the socket 20 is provided with a socket side rod 22 (filling apparatus side rod-shaped member), a socket side valve body 25 integrally connected to the hydrogen filling apparatus side (upper in FIG. 2) of the socket side rod 22, a socket side spring 23 adjacent to the filling apparatus side (upper in FIG. 2) of the socket side valve body 25, a first cylindrical member 28 arranged on the side separated from the filling apparatus side (lower in FIG. 2) of the socket side rod 22, and a second cylindrical member 29. The socket side rod 22, the socket side valve body 25, the socket side spring 23, the first cylindrical member 28, and the second cylindrical member 29 are accommodated in an accommodating portion 21D (FIG. 7) and a socket side rod accommodating portion 21G (FIG. 7) which are internal spaces of a casing 21 not shown (FIG. 1). The first and second cylindrical members 28 and 29 are fixed to the casing 21, and the socket side rod 22 is movable in internal spaces of the first and second cylindrical members 28 and 29 in an axial direction. As shown in FIGS. 2 and 3, on the socket side rod 22 is formed a first protrusion 22A and a second protrusion 22B located at a side separated from the filling apparatus side from the first protrusion 22A (lower sides of FIGS. 2 and 3) and a lower end of the socket side rod 22.

In FIG. 2, on a side surface of the plug side protruding member 3 is formed a hole 3A (recess), and when the plug 10 and the socket 20 are connected with each other, the first protrusion 22A of the socket side rod 22 is inserted into the hole 3A. The hole 3A and the first protrusion 22A of the socket side rod 22 constitute a first conversion mechanism 26, and the second protrusion 22B of the socket side rod 22 and the first cylindrical member 28 form a second conversion mechanism 27. In the state where the plug 10 and the socket 20 are connected, the plug side protruding member 3 is inserted into a through hole 21C (FIG. 6) formed in a casing 21 (not shown in FIG. 2) of the socket 20. As shown in FIGS. 2 and 11, in the illustrated embodiment, a central axis extending in a longitudinal direction of the plug side rod 2 (FIG. 6) and the plug protruding member 3 and a longitudinal central axis of the socket side rod 22 are not arranged in the same straight line and are approximately orthogonal. The central axis of the plug side rod 2 and the plug-protruding member 3 and the central axis of the socket side rod 22 do not intersect and are offset or separated.

FIG. 4 shows the first cylindrical member 28, a state in which the first cylindrical member 28 is viewed from diagonally above is shown in FIG. 4(A), and a plane is shown in FIG. 4(B). The cross section taken along the line C-C of FIG. 4(B) is shown in FIG. 4(C). Convex portions 28C are formed on an upper edge portion 28A of the first cylindrical member 28 at positions symmetrical with respect to the central axis of the first cylindrical member 28 (positions facing each other in a radial direction), and the convex portions 28C protrude inward in a radial direction. The first cylindrical member 28 is hollow and has an internal space 28B. Although the second conversion mechanism 27 will be described later with reference to FIG. 8, the convex portions 28C of the upper edge portion 28A of the first cylindrical member 28 mount the second protrusion 22B of the socket side rod 22 when the plug 10 is connected to the socket 20. But, when the socket side rod 2 rotates when the connection between the plug 10 and the socket 20 is released, the second protrusion 22B comes off from the convex portions 28C and the second protrusion 22B falls and moves downward (see FIGS. 4(A) and 2) in the hollow internal space 28B of the first cylindrical member 28.

As shown in FIG. 2, the second cylindrical member 29 is arranged adjacent to a lower side of the first cylindrical member 28. FIG. 5 shows the second cylindrical member 29, a state in which the second cylindrical member 29 is viewed from diagonally above is shown in FIG. 5(A), a plane is shown in FIG. 5(B), and the D-D cross section of FIG. 5(B) is shown in FIG. 5(C). A rod insertion hole 29B extends downward (downward in FIGS. 5(A) and 2) from the upper edge 29A of the second cylindrical member 29, and the socket side rod 22 can be inserted into the rod insertion hole 29B. In FIG. 5(C), the rod insertion hole 29B communicates with an internal space 29C of the hollow second cylindrical member 29. When the connection between the plug 10 and the socket 20 is released and the socket side rod 22 moves downward (in FIG. 2), the upper edge portion 29A of the second cylindrical member 29 functions as a receiving portion or a stopper for the rectangular second protrusion 22B of the socket side rod 22. When the second protrusion 22B of the socket side rod 22 is received by the upper edge portion 29A of the second cylindrical member 29, a portion of the socket side rod 22 on a tip side (lower side in FIG. 2) of the second protrusion 22B is housed in the hollow internal space 29C of the second cylindrical member 29. In other words, the first cylindrical member 28 and the second cylindrical member 29 have a function of rotatably supporting the socket side rod 22 and a function of supporting the socket side rod 22 so as to be movable in a longitudinal direction by a certain distance (by the sum of the longitudinal distances of the internal spaces of the first cylindrical member 28 and the second cylindrical member 29).

In FIG. 6, the through hole 21C is formed in the casing 21 of the socket 20, and the plug side protruding member 3 is inserted into the through hole 21C. An in-plug passage 1A is formed in a vertical center of the plug body 1 (in FIG. 6), and the in-plug passage 1A extends in a horizontal direction in FIG. 6. The plug side valve body accommodating portion 1C, which is an expanded area, is provided in the in-plug passage 1A. The in-plug passage 1A is composed of an internal space 3B which is a flow path in the plug side protruding member 3 and a flow path in the plug side valve body accommodating portion 1C and extends to the hydrogen gas supply port 1B. In other words, the in-plug passage 1A includes the internal space 3B of the plug side protruding member 3 and the plug side valve body accommodating portion 1C. The plug side rod 2 is housed in the in-plug passage 1A. A plug side valve body 6 is provided at a tip of the plug side rod 2 on the side separated from the socket 20 (on the right side in FIG. 6). The plug side valve body 6 is housed in the valve body accommodating portion 1C. In the valve body accommodating portion 1C, a plug side spring 4 (elastic material) is arranged on the vehicle side of the plug side valve body 6 (the side separated from the socket 20: right side in FIG. 6), and the plug side spring 4 urges the plug side valve body 6 on the socket 20 side (left side in FIG. 6). The plug side valve body 6 and the valve seat 1F constitute a plug side shutoff valve 5, and the valve seat 1F is formed of a step portion of a valve body accommodating portion 1C. The plug side shutoff valve 5 has a function of shutting or opening the in-plug passage 1A.

In FIG. 6, a groove for locking balls is formed near a tip of the plug side protruding member 3 on the socket 20 side (left side in FIG. 6), and the locking balls 7 are held therein. On the socket 20 side (socket body 21), an annular ball accommodating space 21F is formed in which the locking balls 7 are accommodated when the connection between the plug 10 and the socket 20 is released. The plug side rod 2 connected to the plug side valve body 6 extends to the socket 20 side, and a flat plate member 2A is provided at a tip thereof. In the state where the plug 10 and the socket 20 are connected, the flat plate member 2A abuts on a portion of the locking balls 7 protruding into the internal space 3B of the plug side protruding member 3, and as a result, the plug side rod 2 does not move to the socket 20 side (left side in FIG. 6) from the position where it comes into contact with the locking balls 7 against the elastic repulsive force of the plug side spring 4. Therefore, as shown in FIG. 6, the plug side valve body 6 is held in a state separated from the plug valve seat 1F, and the shutoff valve 5 of the plug 10 is held in an open state.

In FIG. 6, the locking balls 7 are not located in the ball accommodating space 21F when the plug 10 and the socket 20 are connected, and are pressed against an inner wall portion of the through hole 21C of the socket 20 in a radial direction and are biased inward (in the direction of the arrows IR in FIG. 6) and project into the internal space 3B of the plug side protruding member 3. In a state where the locking balls 7 protrude into the internal space 3B of the plug side protruding member 3, the locking balls 7 are pressed by the flat plate member 2A and are pushed outward in a radial direction (opposite direction of the arrows IR: the direction of the arrows RO in FIG. 9). In FIG. 7, when the plug 10 and the socket 20 are connected, the first protrusion 22A of the socket side rod 22 is inserted into the hole 3A (recess) formed in the plug side protrusion member 3. The socket side rod accommodating portion 21G of the socket body 21 and the internal space 3B of the plug side protruding portion 3 communicate with each other through the hole portion 3A, thereby forming a hydrogen gas flow path together with the annular ball accommodating space 21F. The references SS are seal members (for example, O-rings).

In FIG. 7, a hydrogen gas introduction port 21B for introducing hydrogen gas supplied from a hydrogen filling machine (not shown) is provided at an end of the socket body 21 on the hydrogen filling apparatus side (upper side in FIG. 7). FIG. 7 shows a state in which the hydrogen gas introduction port 21B is covered with the lid 31. The socket body 21 is formed with the in-socket passage 21A extending in a vertical direction (FIG. 7). An expanded area is formed in-socket passage 21A, and the expanded area constitutes a socket side valve body accommodating portion 21D for accommodating the socket side valve body 25. A hollow socket side rod accommodating portion 21G is formed below the socket side valve body accommodating portion 21D (in FIG. 7). As a result, the hydrogen gas introduction port 21B communicates with the opening portion 21C of the socket body 21 via the socket side valve body accommodating portion 21D and the socket side rod accommodating portion 21G (and the ball accommodating space 21F). The opening portion 21C of the socket body 21 extends in a direction perpendicular to the paper surface of FIG. 7 (left-right direction in FIG. 6), and an end portion of the opening portion 21C on the side separated from the plug 10 (left side in FIG. 6) is open. That is, the opening portion 21C in FIGS. 6 and 7 is configured as a through hole. In FIGS. 6 and 7, when the plug 10 and the socket 20 are connected, the plug side protruding portion 3 is inserted into the opening portion 21C.

In FIG. 7, a socket side rod 22 is connected to a side (lower in FIG. 7), separated from the hydrogen gas introduction port 21B side, of the socket side valve body 25 housed in the socket side valve body accommodating portion 21D. Further, in the socket side valve body accommodating portion 21D, the socket side spring 23 (elastic material) is arranged in the region of the socket side valve body 25 on the hydrogen gas introduction port 21B side (upper in FIG. 7), and the spring 23 urges the socket side valve body 25 to the valve seat 21E side (lower in FIG. 7). The valve seat 21E is composed of a step portion of the valve body accommodating portion 21D, the socket side shutoff valve 24 is formed by the valve body 25 and the valve seat 21E, and the socket side shutoff valve 24 has a function of shutting or opening the in-socket passage 21A. In FIG. 7, when the plug 10 and the socket 20 are connected, the first protrusion 22A of the socket side rod 22 is inserted into the hole 3A (through hole) of the plug side protrusion member 3. Further, as will be described later with reference to FIG. 8, the second protrusion 22B of the socket side rod 22 is placed on the upper edge portion 28A (FIGS. 4 and 8) of the first cylindrical member 28. The socket side rod 22 does not move below the state shown in FIG. 7 (when the plug 10 and the socket 20 are connected). As a result, the socket side valve body 25 connected to the socket side rod 22 is, as shown in FIG. 7, held in a state of being separated from the socket side valve seat 21E upward in FIG. 7, and the socket side shutoff valve 24 is held in an open state.

When the plug 10 and the socket 20 are connected, the shutoff valve 24 of the socket 20 and the shutoff valve 5 of the plug 10 are held in open states, and a gas can be filled into a vehicle from a filling apparatus (not shown). In other words, as shown in FIGS. 6 and 7, when the plug 10 and the socket 20 are connected, the socket side shutoff valve 24 is open, so that the plug side protrusion 3 is inserted into the opening portion 21C, and the hydrogen gas introduction port 21B communicates with the in-plug passage 1A (the internal space 3B of the protruding portion 3 on the plug side) through the in-socket passage 21A (the socket side valve body accommodating portion 21D and the socket side rod accommodating portion 21G), the annular ball accommodating space 21F, and the hole portion 3A (through hole) formed in the plug side protruding member 3. Since the shutoff valve 5 of the plug 10 is also open, the internal space 3B of the plug side protrusion 3 communicates with the hydrogen gas supply port 1B via the valve body accommodating portion 1C. That is, in the state where the plug 10 and the socket 20 are coupled, a hydrogen gas flow path communicating from the hydrogen gas introduction port 21B to the hydrogen gas supply port 1B is configured.

On the other hand, when the plug 10 is removed from the socket 20 (when the connection between the plug 10 and the socket 20 is released), the plug side protruding member 3 moves in a longitudinal direction (to the right in FIG. 6), and the movement is converted to the rotation of the socket side rod 22 by the first conversion mechanism 26 (the hole 3A of the plug side protrusion member 3 and the first protrusion 22A of the socket side rod 22). Then, when the socket side rod 22 rotates, relative position of the second protrusion 22B of the socket side rod 22 with respect to the upper edge portion 28A of the first cylindrical member 28 changes. In FIG. 8, the upper edge portion 28A of the first cylindrical member 28 (see FIG. 4) has regions (convex portions 28C) protruding radially inward at positions symmetrical with respect to the central axis of the first cylindrical member 28 (positions facing in a radial direction). The first cylindrical member 28 has a hollow shape and has an internal space 28B. When the plug 10 and the socket 20 are connected as shown in FIGS. 6 and 7, both ends, in a longitudinal direction, of the rectangular second protrusion 22B of the socket side rod 22 are, as shown with a solid line in FIG. 8, placed on the convex portions 28C (position A) in the upper edge portion 28A of the first cylindrical member 28. In FIG. 8, only the second protrusion 22B is shown, and the entire socket side rod 22 is not shown. On the other hand, when the connection between the plug 10 and the socket 20 is released, the plug side protruding member 3 is pulled out of the socket 20, so that the hole 3A also moves in a longitudinal direction of the plug side protruding member 3. Since the first protrusion 22A of the socket side rod 22 is inserted into the hole 3A of the plug side protrusion member 3, when the hole 3A moves in a longitudinal direction of the plug side protrusion member 3, the movement is transmitted to the first protrusion 22A, and the socket side rod 22 rotates around the center of rotation C (FIG. 8), and the second protrusion 22B of the socket side rod 22 also rotates and moves, for example, at the position shown by the dotted line (position B) in FIG. 8, the both ends of the second protrusion 22B in a longitudinal direction are separated from the convex portions 28C of the first cylindrical member 28. That is, the second protrusion 22B is not placed on the upper edge portion 28A of the first cylindrical member 28. As a result, due to weights of the socket side rod 22, the socket side valve body 25 and others, and the elastic repulsive force of the socket side spring 23, the socket side rod 22 moves (falls) downward in FIGS. 7 and 10 (in the direction urged by the elastic repulsive force of the socket side spring 23) in an internal space 28B of the first cylindrical member 28.

As described above, the first conversion mechanism 26 (the hole 3A of the plug side protruding member 3 and the first protrusion 22A of the socket side rod 22) converts the movement of the plug side protruding member 3 trying to come out of the socket 20 into the rotation of the socket side rod 22. Then, the second conversion mechanism 27 (the second protrusion 22B of the socket side rod 22 and the first cylindrical member 28) converts the rotation of the socket side rod 22 into the movement of the socket side rod 22 (lower in FIGS. 7 and 2). Although not explicitly shown in FIG. 8, when the socket side rod 22 rotates and moves (downward in FIGS. 7 and 2), the rectangular second protrusion 22B of the socket side rod 22 is placed on the upper edge portion 29A of the second cylindrical member 29 (see FIG. 5), and a portion of the socket side rod 22 on the tip side (lower side in FIGS. 7 and 2) from the second protrusion 22B is housed in the rod insertion hole 29B of the second cylindrical member 29 and the hollow internal space 29C. As is clear from comparing FIG. 11 showing a state in which the socket side rod 22 is moved to the plug 10 side (a state in which the plug 10 and the socket 20 are separated) and FIG. 2 showing a state in which the plug 10 and the socket 20 are connected. The length of the socket side rod 22 shown in FIG. 11 is shorter than the length of the socket side rod 22 shown in FIG. 2. This is because the vicinity of the lower end of the socket side rod 22 is accommodated in the internal space 28B of the first cylindrical member 28 (FIGS. 4 and 8) and the internal space 29C of the second cylindrical member 29 (FIG. 5).

The motion of the plug 10 in the initial stage in which the plug 10 is removed from the socket 20 constituting the pipe joint 100 will be described with reference to FIG. 9. When the plug 10 starts to come out from the socket 20, the plug protruding member 3 moves in a longitudinal direction (right side of FIG. 9; direction of the arrow D). With this, in the initial stage when the plug 10 comes out of the socket 20, the longitudinal position of the locking balls 7 becomes the longitudinal position of the annular ball accommodating space 21F as shown in FIG. 9, so that the locking balls 7 are pressed by the flat plate member 2A of the plug side rod 2 and pressed outward in a radial direction (in a direction of the arrows RO in FIG. 9) to move to the ball accommodating space 21F side. As a result, no portion of the locking balls 7 protrudes into the internal space 3B of the plug protruding member 3. Since the locking balls 7 do not protrude into the internal space 3B of the plug protruding member 3 and the flat plate member 2A at the tip of the plug side rod 2 and the locking balls 7 do not come into contact with each other, the plug side spring 4 extends due to elastic repulsive force, and moves the plug side valve body 6, the plug side rod 2 and the flat plate member 2A at the tip of the rod to the left side of FIG. 9 (a side that the plug side spring 4 extends). As a result, the plug side valve body 6 seats on the plug side valve seat 1F, which closes the plug side shutoff valve 5, and the in-plug passage 1A is closed. In FIG. 9, the fact that the plug side rod 2 and the flat plate member 2A at the tip of the rod move to the left end (socket side end) of the internal space 3B of the plug protruding member 3 is caused by inertia.

Next, a motion on the socket 20 side in the initial stage when the plug 10 is pulled out from the socket 20 will be described with reference to FIGS. 10 (and 9). As described above, since the first protrusion 22A of the socket side rod 22 is inserted into the hole 3A (recess, see FIG. 7) of the plug side protrusion member 3, the movement of the plug side protrusion member 3 out of the socket 20, that is, the movement in a longitudinal direction (right direction in FIG. 9; direction of the arrow D) is converted into a rotation around the axis of the socket side rod 22. Then, as described with reference to FIG. 8, the rotation of the socket side rod 22 causes the position where the second protrusion 22B of the socket side rod 22 is mounted on an upper edge portion 28A (FIG. 8) of the first cylindrical member 28 moves from the position shown by the solid line in FIG. 8 to the position shown by the dotted line, and the socket side rod 22 moves in an direction that the socket side spring 23 extends (downward in FIG. 10). The socket side rod 22 moves in the direction that the socket side spring 23 extends (downward in FIG. 10) due to the weight of the socket side valve body 25 and due to the elastic repulsive force of the socket side spring 23, so that the socket side rod 22 moves in the direction that the socket side spring 23 extends (downward in FIG. 10) in the internal space 28B of the first cylindrical member 28. Then, the socket side valve body 25 also immediately descends and sits on the socket side valve seat 21E, which closes the socket side shutoff valve 24 and the in-socket passage 21A.

Here, as described above with reference to FIGS. 1 to 7, when the socket 20 and the plug 10 are connected, the plug side protruding member 3 does not move relative to the socket 10, so that the position of the plug side protruding member 3 relative to the socket 10 in a longitudinal direction (right direction in FIG. 9: direction of the arrow D) does not change. Since the first protrusion 22A of the socket side rod 22 is inserted into the hole 3A (recess) of the plug side protrusion member 3, if the plug side protrusion member 3 does not move in a longitudinal direction, the first protrusion 22A of the socket side rod 22 does not move either, and the socket side rod 22 does not rotate either. As a result, in FIG. 8, even areas of the both ends, in a longitudinal direction, of the second protrusion 22B (shown by the solid line in FIG. 8) placed on the regions 28C (convex portions) project inward in a radial direction of the upper edge portion 28A of the first cylindrical member 28 is small, since the socket side rod 22 does not rotate, the second protrusion 22B of the socket side rod 22 does not rotate (move) at the position shown by the solid line in FIG. 8 and does not deviate from the areas 28C. As a result, even if the weight of the socket side valve body 25 and the like and the elastic repulsive force of the socket side spring 23 act on the socket side rod 22, the socket side rod 22 does not descend in the internal space 28B of the first cylindrical member 28 and the internal space 29C of the cylindrical member 29, and the state in which the socket side shutoff valve 24 is open is maintained.

As described above with reference to FIGS. 9 and 10, unlike the conventional technique shown in FIG. 16, in the illustrated embodiment, the socket side valve body 25 is immediately seated on the socket side valve seat 21E at the initial stage when the plug 10 starts to come out from the socket 20, which closes the socket side shutoff valve 24 and the in-socket passage 21A. Therefore, the flow rate of high-pressure hydrogen gas supplied from the filling apparatus flowing out to the outside of the pipe joint 100 as an out gas is extremely reduced.

FIGS. 12 and 13 show a state in which the plug 10 is separated from the socket 20 constituting the pipe joint 100. In FIG. 12, the plug side protruding member 3 of the plug 10 is detached from (not inserted into) the opening portion 21C of the socket 20 (socket body 21). As a result, the plug side valve body 6 is pressed to the left in FIG. 12 by the elastic repulsive force of the plug side spring 4, and is seated on the plug side valve seat 1F, and the plug side shutoff valve 5 is closed. In FIG. 13, the socket side rod 22 moves in a direction that the spring 23 extends (downward in FIG. 13), and the socket side valve body 25 moves downward in FIG. 13 due to elastic repulsive force of the socket side spring 23, then the socket side valve body 25 seats on the socket side valve seat 21E to close the socket side shutoff valve 24. In FIGS. 12 and 13, the plug side shutoff valve 5 and the socket side shutoff valve 24 close the in-plug passage 1A and the in-socket passage 21A respectively, so that hydrogen gas will not leak from both of the vehicle side and the filling apparatus side.

According to the pipe joint 100 of the embodiment shown in FIGS. 1 to 13, the central axes of the in-plug passage 1A and the in-socket passage 21A are arranged orthogonally (that is, they are not arranged on the same and one straight line), and the central axes of the in-plug passage 1A and the in-socket passage 21A do not intersect and are separated from each other. With the structure, the movement of the plug 10 when the plug 10 is detached from the socket 20 is easily converted into the rotation of the socket side rod 22, and further, the rotation of the socket side rod 22 can be converted into the movement of the socket side rod 22 in a direction that the socket side spring 23 extends in a direction (downward) of the central axis of the socket side rod 22.

Specifically, the first conversion mechanism 26, which is composed of the hole 3A (recess) formed in the plug side protruding member 3 of the plug 10 and the first protrusion 22A formed on the socket side rod 22 and insertable into the hole 3A, converts the movement of the plug 10 into the rotation of the socket side rod 22. Further, the second conversion mechanism 27, which is composed of the second protrusion 22B provided at the tip of the socket side rod 22 and the first cylindrical member 28, converts the rotation of the socket side rod 22 into the movement of the socket side rod 22 in a direction that the socket side spring 23 extends in a direction (downward) of the central axis of the socket side rod 22.

When the plug 10 starts to come out of the socket 20 and the socket side rod 22 rotates, the socket side rod 22 moves quickly and surely in a direction that the socket side spring 23 extends (downward). The movement of the socket side rod 22 in the direction that the socket side spring 23 extends causes the socket side valve body 25 to be pressed to the socket side valve seat 21E with the elastic repulsive force of the socket side spring 23 to close the socket side shutoff valve 24 quickly and reliably. As a result, in the illustrated embodiment, unlike the prior art described with reference to FIG. 16, the socket side valve body 25 immediately sits on the socket side valve seat 21E at the initial stage when the plug 10 is detached from the socket 20 to close the socket side shutoff valve 24. With this, when the plug 10 is detached from the socket 20, the flow rate of the high-pressure gas discharged as outgas from the pipe joint 100 can be extremely reduced.

FIG. 14 shows a modified example of the illustrated embodiment. In the embodiment shown in FIGS. 1 to 13, in a state where the plug 10 is connected to the socket 20, for example, as shown in FIG. 6, the opposite side of the plug 10 of the opening portion 21C of the socket body 21 (left side in FIG. 6) is open and not closed. On the other hand, in FIG. 14, a silencer 30 is connected to the opening (opening on the left side of FIG. 6), on the opposite side to which the plug 10 is connected, of the opening portion 21C (through hole) of the socket body 21 of the socket 20 to suppress noise when filling with gas. Other configurations and operational effects in the modified example of FIG. 14 are the same as those of the embodiment in FIGS. 1 to 13.

Since the embodiments shown in the drawings are merely examples, and the embodiments do not limit the technical scope of the present invention.

DESCRIPTION OF THE REFERENCE NUMERALS 1 plug body
1A in-plug passage
2 plug side rod
3 plug side protruding member
3A hole (recess),
5 plug side shutoff valve
6 plug side valve body
10 plug (nozzle side member)
20 socket (filling apparatus side member)
21 socket body
21A in-socket passage
21C socket through hole (opening portion)
22 socket side rod (filling apparatus side rod-shaped member)
22A first protrusion
22B second protrusion
24 socket side shutoff valve 25 socket side valve body
26 first conversion mechanism
27 second conversion mechanism
28 first cylindrical member (hollow member)
28A upper edge portion
28B inner space
28C convex portion
29 second cylindrical member (hollow member)
100 pipe joint

What is claimed is:

1. A pipe joint comprising:
a cylindrical nozzle side member with a first shutoff valve, in said cylindrical nozzle side member being formed a first passage; and
a cylindrical filling apparatus side member with a second shutoff valve, in said cylindrical filling apparatus side member being formed a second passage,
wherein when the cylindrical nozzle side member and the cylindrical filling apparatus side member are connected with each other, central axes of the first and second passages do not form a same straight line, and the central axes of the first and second passages are offset without intersecting, and the first and second shutoff valves open to communicate the first and second passages with each other, and when the cylindrical nozzle side member is separated from the cylindrical filling apparatus side member, the first and second shutoff valves close.

2. The pipe joint as claimed in claim 1, wherein said cylindrical filling apparatus side member includes a filling apparatus side rod-shaped member extending from a valve body of the second shutoff valve to a side of the cylindrical nozzle side member, and said pipe joint further comprising: a first conversion mechanism for converting a movement of the cylindrical nozzle side member when the cylindrical nozzle side member is separated from the cylindrical filling apparatus side member into a rotation of the filling apparatus side rod-shaped member, and a second conversion mechanism for converting the rotation of the filling apparatus side rod-shaped member into a movement of the filling apparatus side rod-shaped member toward the cylindrical nozzle side member in a central axis direction of the filling apparatus side rod-shaped member.

3. The pipe joint as claimed in claim 2, wherein said first conversion mechanism includes a recess formed on a protruding portion of the cylindrical nozzle side member, said protruding portion being inserted into a through hole formed in the cylindrical filling apparatus side member in a state where the cylindrical nozzle side member and the cylindrical filling apparatus side member are connected with each other, and a first protrusion, formed on the filling apparatus side rod-shaped member, insertable into the recess.

4. The pipe joint as claimed in claim 2, wherein said second conversion mechanism includes a second protrusion provided on an end portion of the filling apparatus side rod-shaped member on a side separated from the valve body of the second shutoff valve, and a hollow member with an upper edge portion on which the second protrusion is placeable, wherein when the cylindrical nozzle side member is connected to the cylindrical filling apparatus side member, the second protrusion is placed on the upper edge portion, and when the filling apparatus side rod-shaped member rotates, the second protrusion separates from the upper edge portion and moves in a hollow internal space.

5. The pipe joint as claimed in claim 4, wherein said second protrusion has a rectangular shape, and the upper edge portion of the hollow member has a shape having convex portions protruding radially inward at positions symmetrical with respect to a central axis of the hollow member, and when the cylindrical nozzle side member is connected to the cylindrical filling apparatus side member, both ends, in a longitudinal direction, of the second protrusion are positioned on the convex portions at the upper edge portion of the hollow member, and when the filling apparatus side rod-shaped member rotates, the both ends of the second protrusion come off from the convex portions of the upper edge portion.

* * * * *